United States Patent [19]

Stuart et al.

[11] Patent Number: 5,434,458
[45] Date of Patent: Jul. 18, 1995

[54] VOICE COIL ACTUATOR

[75] Inventors: Keith O. Stuart, Cypress; Dennis C. Bulgatz, Reseda, both of Calif.

[73] Assignee: Aura Systems, Inc., El Segundo, Calif.

[21] Appl. No.: 286,597

[22] Filed: Aug. 5, 1994

Related U.S. Application Data

[63] Continuation of Ser. No. 925,085, Aug. 4, 1992, abandoned, which is a continuation-in-part of Ser. No. 740,068, Aug. 5, 1991, Pat. No. 5,321,762.

[51] Int. Cl.⁶ .............................................. H02K 41/00
[52] U.S. Cl. ........................................ 310/13; 318/135
[58] Field of Search ...................... 310/13, 15, 14, 23; 318/135

[56] References Cited

U.S. PATENT DOCUMENTS

| | | | |
|---|---|---|---|
| 4,652,779 | 3/1987 | Wilcox | 310/13 |
| 4,669,013 | 5/1987 | Scranton et al. | 310/13 X |
| 4,692,999 | 9/1987 | Frandsen | 310/13 X |
| 4,808,955 | 2/1989 | Godkin et al. | 310/13 X |

FOREIGN PATENT DOCUMENTS 711704  2/1974  U.S.S.R. .

*Primary Examiner*—Thomas M. Dougherty
*Assistant Examiner*—Ed To
*Attorney, Agent, or Firm*—Anthony T. Cascio; Lisa A. Merkadeau

[57] ABSTRACT

A voice coil actuator includes a magnetic flux conductive material core, a magnet and an electrical current conductive coil. The core has a first surface and a continuous channel disposed in the first surface. The channel has a pair of opposing walls. The magnet is disposed in intimate contact with a first one of the walls and spaced from a second one of the walls so that a gap remains between the magnet and the second one of the walls. The magnet has a first face of a first magnetic polarity facing the first one of the walls and a second face of a second, opposite magnetic polarity facing the gap. The magnet is further spaced from a bottom of the channel so that magnetic flux is substantially normal from the second face across the gap to the second one of the walls. The electrical current conductive coil is disposed moveably in the gap such that an electrical current in the coil develops a magnetic force on the coil in a direction substantially normal to the magnetic flux to displace the coil in response to the magnetic force.

9 Claims, 3 Drawing Sheets

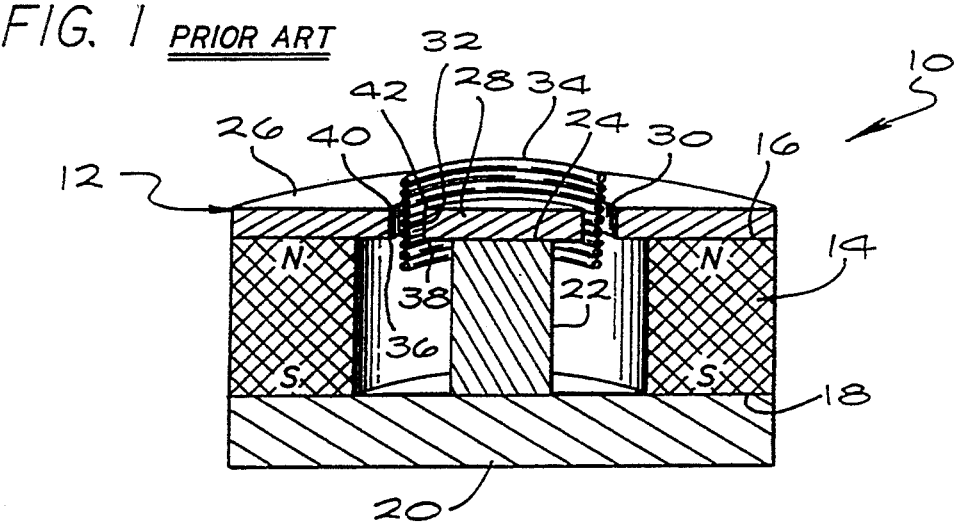
FIG. 1 PRIOR ART
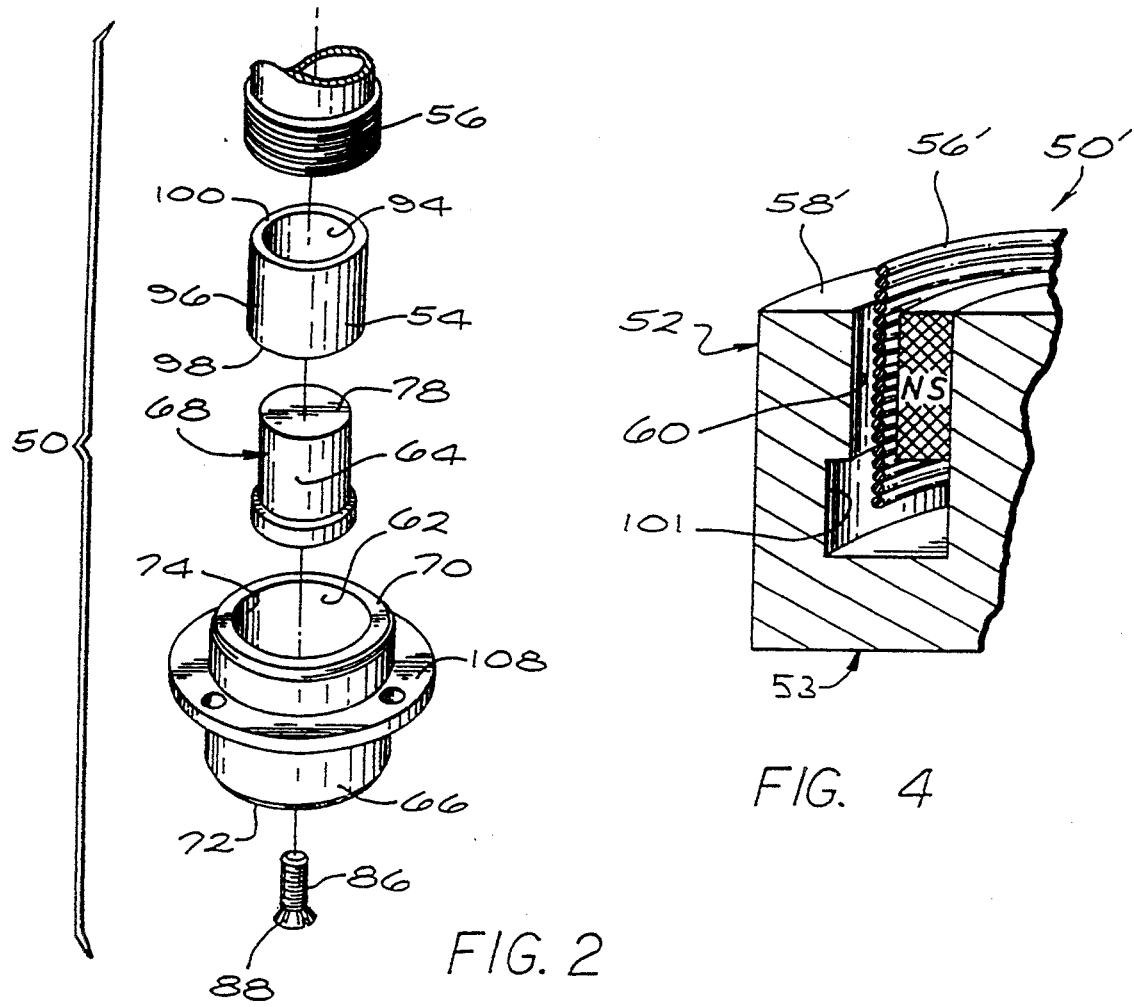
FIG. 2
FIG. 4

VOICE COIL ACTUATOR

RELATED APPLICATION DATA

This is a continuation of application Ser. No. 07/925,085 filed on Aug. 4, 1992 now abandoned, which is a continuation-in-part of commonly-owned Ser. No 740,068, filed Aug. 5, 1991, now U.S. Pat. No. 5,321,762, which issued on Jun. 14, 1994.

FIELD OF THE INVENTION

The present invention relates generally to electromagnet actuators and more particularly to a novel voice coil actuator and a speaker constructed therefrom.

BACKGROUND OF THE INVENTION

In a typical voice coil actuator, an electrical current conductive coil is suspended at a zero current bias position within a magnetic field formed in a gap of a permanent magnet core. It is highly desirous that the flux path of the field within this gap be optimally radial with respect to the axis of the coil so that when an externally applied current conducts through the coil, the coil will be displaced axially from its zero current bias position in an amount linearly proportional to such current. However, as will be seen from the following discussion, the flux path is, in the known prior art voice coil actuator, not at an ideal radial orientation with respect to the coil.

Referring to prior art FIG. 1, there is shown a long coil actuator 10 which is one particular type of prior art voice coil actuator. The construction of its core 12 is based on an axially polarized cylindrical magnet 14 which has a first end face 16 at a first magnetic polarity and a second end face 18 at a second, opposite magnetic polarity. The first end face 16 of the magnet 14 is coaxially mounted on a disk shaped base plate 20 of the core 12. The base plate 20 is formed from magnetic flux conductive material and has a diameter commensurate with the outer diameter of the magnet 14. Mounted on the base plate 20 coaxially within the magnet 14 is a rod 22 of magnetic flux conductive material wherein the rod 22 has a diameter less than the inner diameter of the magnet 14 so that a space therebetween remains. The distal free end 24 of the rod 22 is elevationally commensurate with the second end face 18 of the magnet 14. Completing the core 12 construction, a ring shaped first pole piece 26 and a disk shaped second pole piece 28 are coaxially mounted respectively to the second end face 18 of the magnet 14 and the distal end 24 of the rod 22. Each pole piece 26,28 is formed from magnet flux conductive material. The first pole piece 26 has an inner diameter less than the inner diameter of the magnet 14 and the second pole piece 28 has a diameter greater than the diameter of the rod 22 with each of these diameters being selected so that a gap remains between the respective facing sides 30,32 of each pole piece 26,28.

A coil 34 is mounted to the above core 12 construction and coaxially suspended within the gap. The overall length of the coil 34 and the height of the gap are selected so that as the coil 34 is moved through its total stroke, defined as the maximum positive and negative axial deviation from its zero current bias position, the number of coil turns within the gap, defining the effective length, L, of the coil 34 remains constant. In the long coil actuator 10, an equal length of the coil 34 extends axially from each end of the gap when the coil 34 is in the zero current bias position as best seen in prior art FIG. 1. The positive and negative stroke limit is then equal to the axially projecting length.

In any prior art voice coil actuator, this condition on the constancy of the coil turns, or the constancy of the effective length, L, within the gap is necessary to maintain the linearity of the relationship between magnetic force, F, on the coil with respect to current, i, within the coil so that $F \propto i$. Since $F = iL \circledS B$, and the magnetic flux density, B, which is assumed to be uniform and radially confined within the gap, it is seen that the force, F, is linearly dependent on the coil current, i, or $F = LBi$, wherein LB is the constant of proportionality. Since the current is assumed to be perpendicular to the uniform radially confined flux, the cross product factor of sine becomes equal to one. The above statement that the gap height and the effective coil length, L, are identical for the long coil actuator 10 from which the linear dependency $F \propto 2$ is derived may only be made if the magnet flux density, B, is assumed to be radially confined and uniformly distributed within the gap.

Another type of known prior art voice coil actuators is known as a short coil actuator. In the short coil actuator, the axial length of the coil is less than the height of the gap and, at zero current bias is centered therein. The positive and negative stroke limit is then equal to one-half of the gap height less the coil length so that the coil is always confined within the gap. Based on the above assumption, the effective length, L, of the coil is then equal to its actual length.

Considering only the geometry of the construction of the long and short coil actuator designs, it would appear that the above condition for linearity exist as long as the magnetic flux density within the gap is assumed to be radially confined and uniformly distributed therein. However, it will be shown that in the prior art voice coil actuators, this assumption is not true. It will therefore become apparent that for either the long coil or short coil actuator, the force, F, is a function of each of the current, i, length, L, and flux density, B, or $F = f(i, L, B)$ wherein $\partial F / \partial L$ and $\partial F / \partial B$ are nonzero quantities as the coil moves axially due to magnetic flux leakage at the edges of the gap and nonuniformity of flux density along the length of the gap, as set forth in greater detail hereinbelow. This nonzero dependency of the force, F, on each of the effective coil length, L, and flux density, B, causes a nonlinear response to the coil current, i, and results in harmonic distortion of the coil actuation. This harmonic distortion is one disadvantage and limitation of the prior art voice coil actuator in that the sound produced by the actuation of the voice coil driving a speaker cone is not a pure analog of the coil current. Another disadvantage and limitation is a reduction of efficiency due to leaking magnetic fields not contributing to the flux passing through the coil.

The assumption on the radial confinement and uniform distribution of the flux density within the gap is false for two reasons which although demonstrated herein below in reference to the long coil actuator 10 are also applicable to the short coil actuator. First, since the respective lower 36, 38 and upper 40, 42 edges of the first and second pole pieces 26,28 present a discontinuity, the flux density fringes outside of the gap from the edges 36,38,40,42 of the pole pieces 26,28 such that the flux is not radially confined within the gap. Secondly, since magnetic flux follows the path of least resistance, the flux density in the gap is therefore greatest at the lower edge 36 of the first pole piece 26 where the first pole piece 26 is adjacent the magnet 14 and decreases toward the upper edge 42 of the second pole piece 28 such that the flux is not uniformly distributed. The nonuniformity of distribution also occurs at the fringing fields at either end of the gap.

In either the long or short coil actuator, the nonuniformity of the flux distribution results in the flux which interacts with the coil to be dependent on the instantaneous position, x, of the coil in the gap as determined at the center of the coil. Since the coil has a finite length within the gap, the current through each loop will be effected by a different value of flux density. The total force, F, acting on the coil will therefore be a summation over the length of the coil of the force developed by the current in each loop of the coil interacting with the flux resulting in the expression $F = \int i(x) \times B(x)dx$, where the lower and upper limits of integration are $x-L/2$ and $x+L/2$, respectively. Since the coil is continuous over its length, the current in each loop is identical, or $i(x)=i$ so that the above expression simplifies to $F = i \int B(x)dx$. Therefore, $\partial F = (\int B(x)dx)\partial i + (i \int B(x)dx)\partial B$.

Therefore, it is seen that the change of force, $\partial F$, is not linear with respect to the change of current, $\partial i$, but depends on the coil position, x, within the gap, the length of the coil, L, since these terms are within the limits of integration, and the variation of the flux density, B, over the length of the coil. This nonuniformity is especially prevalent in the short coil actuator since the gap height being much greater than the coil length causes the coil to be exposed to a greater degree of nonuniformity of the flux density along the length of the gap. An additional nonlinearity is introduced in the long coil actuator since the coil at either stroke extreme is removed from a fringing field external of the gap, thereby making the effective coil length, L, also a function of the coil position, x, or $L=L(x)$, which therefore introduces a nonlinear variable into the limits of integration.

In addition to the above described nonlinearities of the known voice coil actuator, a further limitation and disadvantage is the magnetic flux leakage external of the core. For example with reference to prior art FIG. 1, the flux will also fringe from each pole end face 16,18 of the magnet 14 external from the core 12. This fringing flux is usually caused by saturation at the core. First, this external fringe results in a waste of useable flux, thereby reducing conversion efficiency of the prior art voice coil actuator. Secondly, this external fringe can also detrimentally interact with nearby electronic circuitry, which often requires the prior art voice coil actuator to be heavily shielded which adds to its size, weight and cost.

SUMMARY OF THE INVENTION

It is therefore an object of the present invention to provide a novel voice coil actuator which minimizes the dependency of actuation force on coil position. It is another object of the present invention to provide a novel voice coil actuator which minimizes flux leakage from the core thereby maximizing efficiency.

According to the present invention, a novel voice coil actuator includes a magnetic flux conductive material core, a magnet and an electrical current conductive coil uniquely arranged. The core has a first surface and a continuous channel disposed in said first surface. The channel has a pair of opposing walls. The magnet is disposed in intimate contact with a first one of said walls and spaced from a second one of said walls so that a gap remains between the magnet and the second one of the walls. The magnet has a first face of a first magnetic polarity facing the first one of the walls and a second face of a second, opposite magnetic polarity facing the gap. The magnet is further spaced from a bottom of the channel so that magnetic flux is substantially normal from the second face across said gap to the second one of the walls. The electrical current conductive coil is disposed moveably in the gap such that an electrical current in the coil develops a magnetic force on the coil in a direction substantially normal to the magnetic flux to displace said coil in response to said magnetic force.

It is a feature of the present invention that one pole of the magnet is adjacent the gap. This construction ensures that the magnetic flux will be uniformly distributed substantially along the length of the gap since the flux emanating from the second face, being a pole, is inherently substantially uniform. This construction also ensures that leakage flux is minimized. Since the flux will follow the path of least resistance, it will prefer to be confined through the core and gap. The minimizing of leakage obviates the need for bulky shielding, simplifying packaging, and allows the novel actuator to be smaller and lighter than existing actuators for the same power output, resulting in further benefits.

These and other objects, advantages and features of the present invention will become readily apparent to those skilled in the art from a study of the following Description of an Exemplary Preferred Embodiment when read in conjunction with the attached Drawing and appended Claims.

BRIEF DESCRIPTION OF THE DRAWING

FIG. 1 (PRIOR ART) is a cross sectional view of a known voice coil actuator of long coil design;

FIG 2 is an exploded view of a novel voice coil actuator of short coil design constructed according to the principles of the present invention;

FIG. 4 is a fragmentary cross sectional view of a modification to the voice coil actuator of FIG. 2 showing a long coil design;

DESCRIPTION OF AN EXEMPLARY PREFERRED EMBODIMENT

Figure 3:
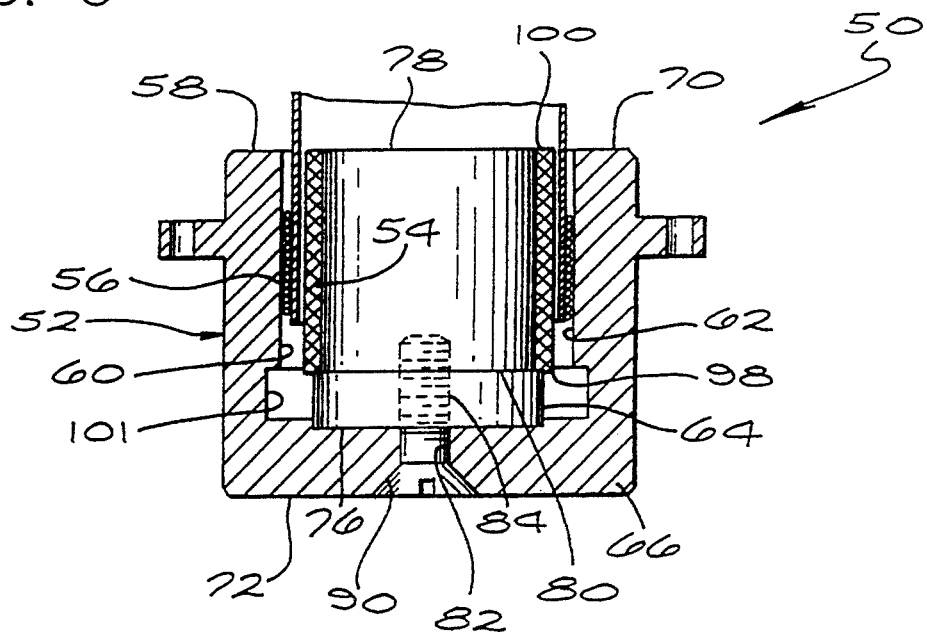
FIG. 3 is a cross sectional view of the voice coil actuator of FIG. 2.

Referring now to FIGS. 2–4, there is shown a novel voice coil actuator 50 constructed according to the principles of the present invention. The actuator 50 includes a core 52 having a backplate 53 and a magnet 54 and an electrical current conductive coil 56. For reasons which will be described in greater detail hereinbelow, a feature of the present invention is that the magnet 54 has a magnetic pole adjacent a gap in which the coil 56 is suspended so that the nonuniformity and fringing of the magnetic field is minimized.

The backplate 53 is constructed from magnetic flux conductive material and has a first surface 58 and a continuous channel 60 disposed in the first surface 58. The channel 60 has an outer first wall 62 and an inner second opposing wall 64. The backplate 53 thus described can be machined from a single piece of magnetic flux conductive metal. In this embodiment, the channel 60 may have any conventional geometry, such as cylindrical or rectangular, although not limited thereto.

In another embodiment of the present invention, the backplate 53 may be assembled from a cylindrical first member 66 and a cylindrical rod 68, each being of magnetic flux conductive material. The first member 66 has a first surface 70 and a second surface 72. The first surface 70 of the first member 66 has a bore 74 which forms the first wall 62 of the channel 60 in the core 52 and a bottom wall 76. The rod 68 is coaxially mounted in the bore 74 to form the inner second wall 64 of the channel 60 and has a first end 78 and a second end 80. The second end 80 of the rod 68 is mounted to the bottom wall 76. The rod 68 has an axial length commensurate with a depth of the bore 74. The first surface 70 of the first member 66 and the first end 78 of the rod 68 together form the surface 58 of the core 52.

To mount the second end 80 of the rod 68 to the bottom wall 76, the second surface 72 of the first member 66 has a coaxial opening 82 therethrough. The second end 80 of the rod 68 has a matching coaxial threaded bore 84. A threaded fastener 86 is received through the opening 82 and engaged in the threaded bore 84. A head 88 of the fastener engages the second surface 72 of the first member 66. The opening 82 may have a frustoconical counterbore 90 and the head 88 may have a matching frustoconical surface 92 so that the head 88 of the fastener 86 is sunk in the second surface 72.

In either of the above embodiments of the backplate 52, the magnet 54 is disposed in intimate contact with the inner second wall 64 so that a gap remains between the magnet and the outer first wall 62. Alternatively, the magnet 54 could be mounted to the outer first wall 62 and spaced from the inner second wall 64. The magnet 54 has a first face 94 of a first magnetic polarity adjacent the inner second wall 64 and a second face 96 of a second, opposite magnetic polarity facing the gap. The magnet 54 has a lower edge 98 spaced from the bottom wall 76 of the channel 60 and an upper edge 100 coextensive with the first end 78 of the rod 68 so that the magnetic flux is substantially confined normal from the second face 94 of the magnet 54 across the gap to the outer first wall 62. Since the second face 96 is a pole of the magnet 54, the flux emanating from this pole will be continuous and uniform across the entire surface of the second face 96 and be of the same intensity at the lower edge 98 and upper edge 100. The flux in the gap of the novel voice coil actuator 50 is therefore uniform along the height of the gap. This uniformity of flux is a significant advantage of the novel actuator 50 exhibits over the prior art actuator 10.

The magnet 54 may be of unitary construction and polarized as above described or may also be constructed from a plurality of magnet segments polarized as above described and arranged side by side. Each segment may be bonded directly to the inner wall 64 to form the magnet 54. In the cylindrical embodiment of the backplate 53, the magnet may be a cylindrical, unitary radially polarized magnet or constructed from radially polarized arc segments arranged side by side. It is also possible to approximate a cylindrical radially polarized magnet by a plurality of flat magnet segments placed side by side on the inner wall 64. The gap remaining between each flat segment would be filled with a flux defocuser, such as iron.

More particularly, the spacing of the lower edge 98 from the bottom wall 76 is selected to be larger than the width of the gap between the magnet 54 and the outer first wall 62. For fringing from the lower edge 98 toward the bottom wall 76 to occur, the fringing field would have an axial component and a radial component. By having the radial component travel a much shorter distance than the axial component, the resistance to the radial component is considerably less than the resistance to the axial component. Since the flux will follow a path of least resistance, these spacings will force the flux to stay radial in the gap and not fringe from the lower edge. Fringing flux may further be minimized by the inclusion of an anti-fringing groove 101 in the outer wall 62. The top of the groove 101 is radially aligned with the lower edge 98 of the magnet 54. Accordingly, the groove 101 increases the length of a fringing field path from the lower edge 98, thereby maintaining the radial confinement of the flux within the gap.

Similarly, fringing flux is also minimized from the upper edge 100 by aligning it coextensive with the first end 78 of the rod 68 and hence in the plane of the first surface 58 of the core 52. Any such fringe would need to travel external of the core and return to the outer first wall 62. Again, this path would be greater than the radial path from the upper edge 100 to the outer wall 62 and have higher magnetic resistance. Furthermore, there is no available path for the flux to leak external of the core 52 which is in direct contrast to the leakage flux between the pole faces 16,18 of the magnet 14 in the prior art voice coil actuator 10. Therefore, the core 52 is inherently self shielding.

The coil 56 is moveably suspended in said gap such that an electrical current in the coil 56 develops a magnetic force on the coil 56 in a direction substantially normal to the radial magnetic flux to displace the coil 56 in response to such magnetic force. Of course, when the coil 56 is coaxially suspended in the gap, the force will be axial and linearly proportional to the current, as is well known. It is known by various means to suspend the coil 56. One particular arrangement will be described hereinbelow.

As best seen in FIG. 3, the length of the coil 56 is less than the height of the gap. Accordingly, the above described actuator 50 is of short coil design. The actuator 50 may also be constructed as a long coil actuator 50' having a coil 56' as best seen in FIG. 4. In either of the short coil actuator 50 or long coil actuator 50', the travel limits of the stroke of the coil are as set forth above with respect to the prior art actuator.

Figure 5:
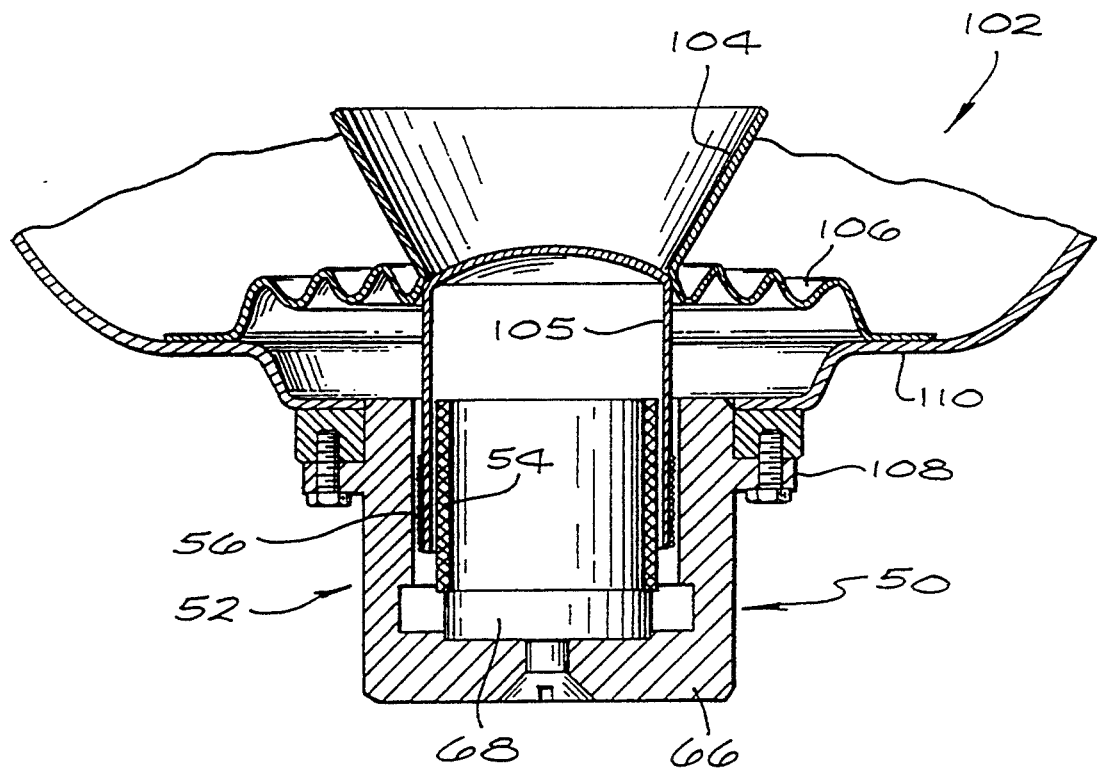
FIG. 5 is a cross sectional view of the actuator of FIG. 2 adapted for use in a speaker.

Referring to FIG. 5, there is shown an application of the novel voice coil actuator 50 in a speaker 102. The speaker includes a speaker cone 104 mechanically connected to the coil 56 through a carrier 105, and a resilient expandable member 106 (known as a spider) attachable to each of the core 52 and the coil 56 to suspend the coil 56 in its zero current bias position. The arrangement of the cone 104 and resilient member 106 are well known. The core 52 may include an annular mounting flange 108 to which a conventional basket 110 may be mounted. The resilient member 106 is conventionally attached to the carrier 105 and the basket 110 as best seen in FIG. 5.

Figure 6:
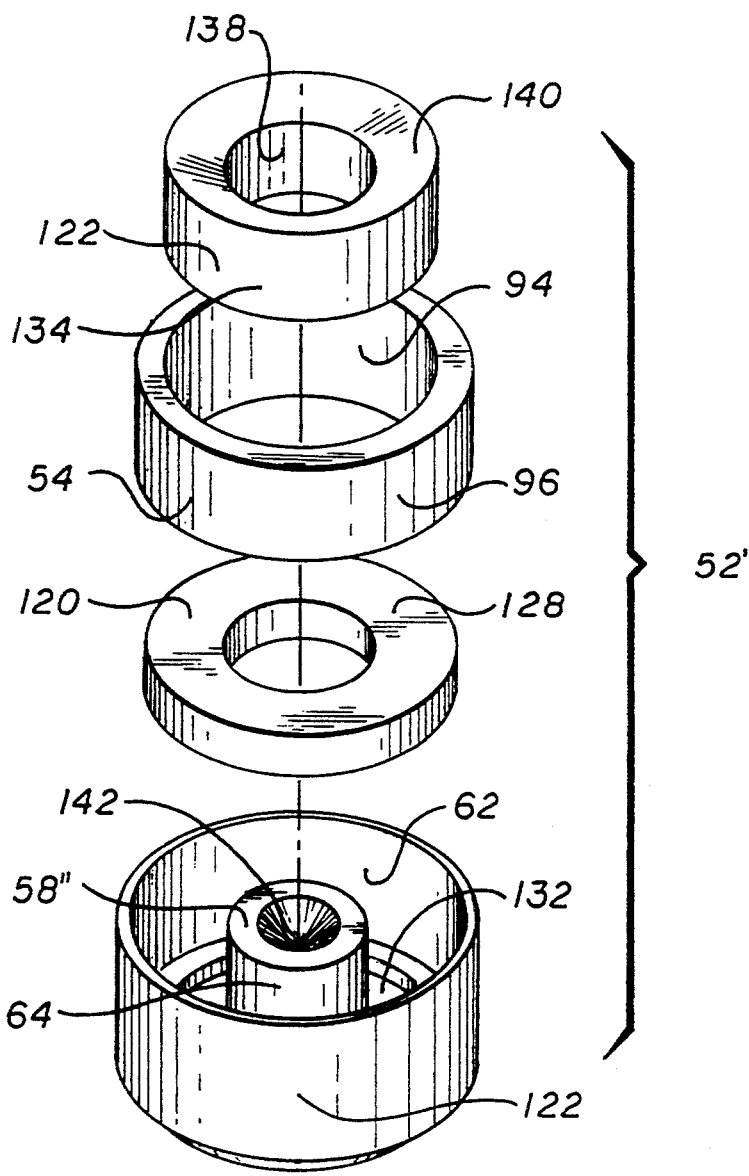
FIG. 6 is an exploded view of an alternate embodiment of a novel voice coil actuator of short coil design constructed according to the principles of the present invention.
Figure 7:
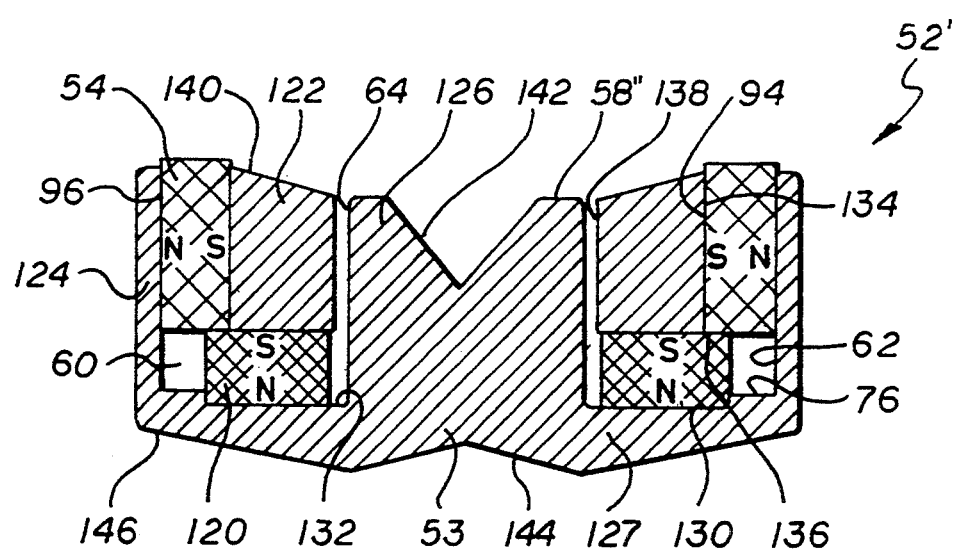
FIG. 7 is a cross sectional view of the voice coil actuator of FIG. 6.

Referring to FIGS. 6–7, there is shown an alternative embodiment core 52'. The core 52' includes the back plate 53 and the first magnet 54, each of which may be constructed as hereinabove described in the several embodiments thereof, and further includes a second magnet 120 and a front plate 122. As described hereinbelow, the second magnet 120 and the front plate may be used exclusively of each other or in combination with each other.

The back plate 53 of the core 52' includes the channel 60, the first wall 62, the second wall 64 and the bottom wall 76 as hereinabove described. More particularly, the back plate 53 forms a structure which has a first member 124, a second member 126 in a spaced apart relationship to the first member 124, and a base or interconnecting member 127 to carry the first member 124 and second member 126.

The first magnet 54 need not be disposed in the core 52' as described in conjunction with the core 52 but need only be carried by the structure of the back plate 53 of the core 52' to develop magnetic flux in a closed loop path across a gap between the first member 124 and second member 126 and further within the first member 124, second member 126 and interconnecting member 127.

According to one particular aspect of the present invention, the second magnet 120 is carried by the structure of the back plate 53 to be placed adjacent the gap and arranged such that the magnetic flux developed by the second magnet 120 has a polarity selected to confine within the gap the flux developed in the core 52' by the first magnet 54. In addition, the flux developed by the second magnet 120 is additive within the gap with the flux developed by the first magnet 54. In the embodiment of the invention shown in FIG. 7, the first magnet 54 defines a first magnet radial length. The second magnet 120 further defines a second radial length. The second magnet radial length preferably exceeds one-half of the first magnet radial length.

In a preferred embodiment of the present invention, the effects of the flux confinement accomplished by the inclusion of the second magnet 120 are achieved by placing the second magnet 120 on the bottom wall 76 of the channel 60 beneath the gap. The bottom wall 76 is also referred to as the surface 76 of the base 127. In this position, the second magnet 120 has a first face 128 of a first magnetic polarity distal the surface 76 and a second face 130 of a second opposite polarity adjacent the surface 76. The second magnet 20 is spaced from the wall 62,64 of the channel 60 which has the opposite polarity as the first face 128. However, the second magnet 120 may be adjacent the other wall 62,64 with the same polarity as the first face 128 and positioned as hereinabove described.

In the embodiment of the present invention wherein the first magnet 54 is adjacent the first wall 62 or the second wall 64 and positioned as hereinabove described, the second magnet is disposed such that its first face 128 has the same polarity as the face of the first magnet 54 adjacent the gap. For example, as best seen in FIG. 7, the first face 94 of the first magnet 54 and the first face 128 of the second magnet 120 are each of the first polarity, designated S, and face the gap. In the embodiment of FIGS. 2–4, the polarity of the second magnet 120 would be reversed with its second face 130 facing the gap with the second face 96 of the first magnet 54 since each has the second polarity, designated as N. As described hereinabove, the second magnet 120 is spaced from the wall 62,64 of opposite polarity from its face 128,130 adjacent the gap. In either arrangement, the front plate 122 need not be present.

When the channel 60 is cylindrical, the second member 126 is an inner member coaxial within the first member 124 which is an outer member, and the first magnet 54 is a cylindrical radially polarized magnet or constructed form segments as described above. The second magnet 120 may then be a conventional cylindrical axially polarized magnet. To facilitate positioning of the second magnet 120, the base 127 may include an annular channel 132 in its surface 76.

According to another aspect of the present invention, the front plate 122 is positioned to be placed within the gap and to provide a second structure which focuses flux between the first member 124 and the second member 126. Again, the first magnet 54 need only be carried by the structure of the back plate 53 in the core 52' so that the flux is in the above described closed loop path.

In the embodiment show in FIG. 6–7, the front plate 122 is disposed within the channel 60 adjacent the first face 94 of the first magnet 54 and spaced from the second wall 64 or second member 126. Similarly, in the embodiment of FIGS. 2–4, the front plate 122 would be adjacent the second face 96 of the magnet 54 and spaced from the first wall 62.

With particular reference to FIG. 7, the front plate 122 has a side first face 134, a bottom second face 136, a side third face 138 and a top fourth face 140. The first face 134 of the front plate 122 is generally coextensive with the first face 94 of the first magnet 54. The third face 138 is spaced from the second second wall 64 or second member 126. such that a gap remains in which the coil 56,56' may be disposed. The second face 136 of the front plate 122 is spaced from the bottom wall 76 of the channel 60 similarly to the spacing of the first magnet 54 therefrom. The second magnet 120 need not be present. With the second magnet 120 present, the second face 136 of the front plate 122 and the first face 128 of the second magnet 120 are generally coextensive. In the cylindrical embodiment, the front plate 122 is an annular ring.

The fourth face 140 of the top plate 122 is generally elevationally commensurate with the surface 58,58',58" of the back plate 53. In the embodiment shown in FIG. 7, the surface 58" is configured such that the height of the first member 124 is greater than the height of the second member 126. The front plate 122 thus becomes trapezoidal in cross section so that its fourth face is elevationally commensurate with the first member 124 at its first face 134 and elevationally commensurate with the second member 126 at its third face 138. Of course, these relationships would be mirror imaged if the first magnet 54 were carried by the second member 126 or second wall 64. In either arrangement, the first magnet 54 may also extend elevationally further than the surface 58,58',58". The face of the front plate 122 adjacent the gap, shown at 138 in FIG. 7, may also extend slightly past the adjacent face, show at 128 in FIG. 7, of the second magnet 120 when the features of the second magnet 120 and front plate 122 are combined.

Finally, the back plate 53 may include either or both of a first conical bore 142 in the second member 126 at the surface 58,58'58" and an opposite conical bore 144 at the backside thereof as best seen in FIG. 7. The base 127 may also have a frustoconical surface 346. The core 52' of FIGS. 6–7 may also be used to construct the speaker 102 of FIG. 5 by inclusion of the flange 108 thereto.

There has been described hereinabove an exemplary preferred embodiment of a novel voice coil actuator.

Those skilled in the art may now make numerous uses of and departures from the above described inventive concepts without departing from the inventive concepts disclosed herein. Accordingly, the present invention is to be defined solely by the scope of the following claims.

I claim:

1. A core for a voice coil actuator comprising:

a magnetic flux conductive material structure including a first member, a second member in a spaced apart relationship to said first member and an interconnecting member to carry said first member and said second member;

a first magnet carried by said structure and arranged such that a magnetic flux is developed in a closed loop path across a gap between said first member and said second member and within each of said first member, said second member and said interconnecting member, and further wherein said first magnet defines a first magnet radial length; and a second magnet carded by said structure and arranged such that magnetic flux developed by said second magnet has a polarity selected to confine within said gap the magnetic flux that is developed by said fast magnet and to be additive within said gap with the magnetic flux that is developed by said first magnet, and further wherein said second magnet defines a second magnet radial length that exceeds one-half of said first magnet radial length, and further wherein said second magnet is cylindrical and axially polarized and disposed on said interconnecting member substantially beneath said gap: and a magnetic flux conductive material front plate disposed within said gap adjacent said first magnet, wherein a substantial portion of said second magnet is in direct contact with said front plate.

2. A core for a voice coil actuator comprising:

a magnetic flux conductive material back plate including a base, an inner member and an outer member in a spaced apart relationship to said inner member, said base having at least a first surface, wherein said inner member and said outer member extend from said first surface;

a first magnet disposed on a first member selected from a group consisting of said inner member and said outer member and spaced from a second member selected from the group consisting of said inner member and said outer member, said first magnet having a first pole of a fast magnetic polarity proximal said first member and a second pole of a second magnetic polarity distal said first member, and further wherein said first magnet defines a first magnet radial length;

a second magnet disposed intermediate said inner member and said outer member on said surface and spaced from at least said second member, said second magnet having a first pole of said first magnetic polarity proximal said fast surface and a second pole of said second magnetic polarity distal said first surface and further wherein said second magnet defines a second magnet radial length that exceeds one-half of said fast magnet radial length; and a magnetic flux conductive material front plate disposed adjacent said second pole of each of said first magnet and said second magnet and spaced from said second member such that a gap remains between said front plate and said second member, and further wherein a substantial portion of said second pole of said second magnet is in direct contact with said front plate.

3. A core as set forth in claim 2 wherein said front plate has a top face elevationally commensurate with a top surface of said back plate.

4. A core as set forth in claim 3 wherein said top surface of said back plate is elevationally higher at said first one of said inner member and said outer member then at said second one of said inner member and said outer member.

5. A core as set forth in claim 4 wherein said front plate is trapezoidal in cross section.

6. A core as set forth in claim 2 wherein said inner member has a first conical bore at one end thereof.

7. A core as set forth in claim 6 wherein said inner member has a second conical bore at the other end thereof.

8. A core as set forth in claim 2 wherein said bore

9. A core as set forth in claim 2 wherein said inner member and said outer member are cylindrical and coaxially disposed, said first magnet is a radially polarized cylindrical magnet and said second magnet is an axially polarized cylindrical magnet.

* * * * *